United States Patent
Paukner

(10) Patent No.: US 6,955,048 B2
(45) Date of Patent: Oct. 18, 2005

(54) DEVICE FOR TELECONTROLLING A FUNCTION OF DRIVES

(76) Inventor: Rudolf Paukner, Baderstrasse 16, 94315 Straubing (DE)

( * ) Notice: Subject to any disclaimer, the term of this patent is extended or adjusted under 35 U.S.C. 154(b) by 0 days.

(21) Appl. No.: 10/471,747

(22) PCT Filed: Mar. 16, 2002

(86) PCT No.: PCT/DE02/00950
§ 371 (c)(1),
(2), (4) Date: Sep. 25, 2003

(87) PCT Pub. No.: WO02/077463
PCT Pub. Date: Oct. 3, 2002

(65) Prior Publication Data
US 2004/0112209 A1 Jun. 17, 2004

(30) Foreign Application Priority Data
Mar. 27, 2001 (DE) .................................... 201 05 352 U

(51) Int. Cl.⁷ ................................................. F15B 7/08
(52) U.S. Cl. ........................................ 60/567; 60/571
(58) Field of Search .......................... 60/567, 571, 592, 60/572

(56) References Cited

U.S. PATENT DOCUMENTS

| 2,334,383 A | | 11/1943 | Carr et al. | |
|---|---|---|---|---|
| 2,608,060 A | * | 8/1952 | Smith | .......................... 60/567 |
| 4,122,678 A | | 10/1978 | Wilson | |

FOREIGN PATENT DOCUMENTS

| DE | 198 02 517 | 5/1999 |
|---|---|---|
| EP | 0 109 477 | 5/1984 |
| FR | 50.008 | 11/1979 |
| GB | 599933 | 3/1948 |

* cited by examiner

Primary Examiner—Thomas E. Lazo
(74) Attorney, Agent, or Firm—Hoffman, Wasson & Gitler

(57) ABSTRACT

The invention relates to a device for telecontrolling a function of drives for vehicles or machines. The device consists of at least two manual gearboxes which are arranged at a distance from the drive to be controlled, the gearboxes respectively having a double acting cylinder arrangement comprising two cylinder chambers which can be actuated in counterrotation for a hydraulic flow medium, in order to control at least one function of said drive.

8 Claims, 1 Drawing Sheet

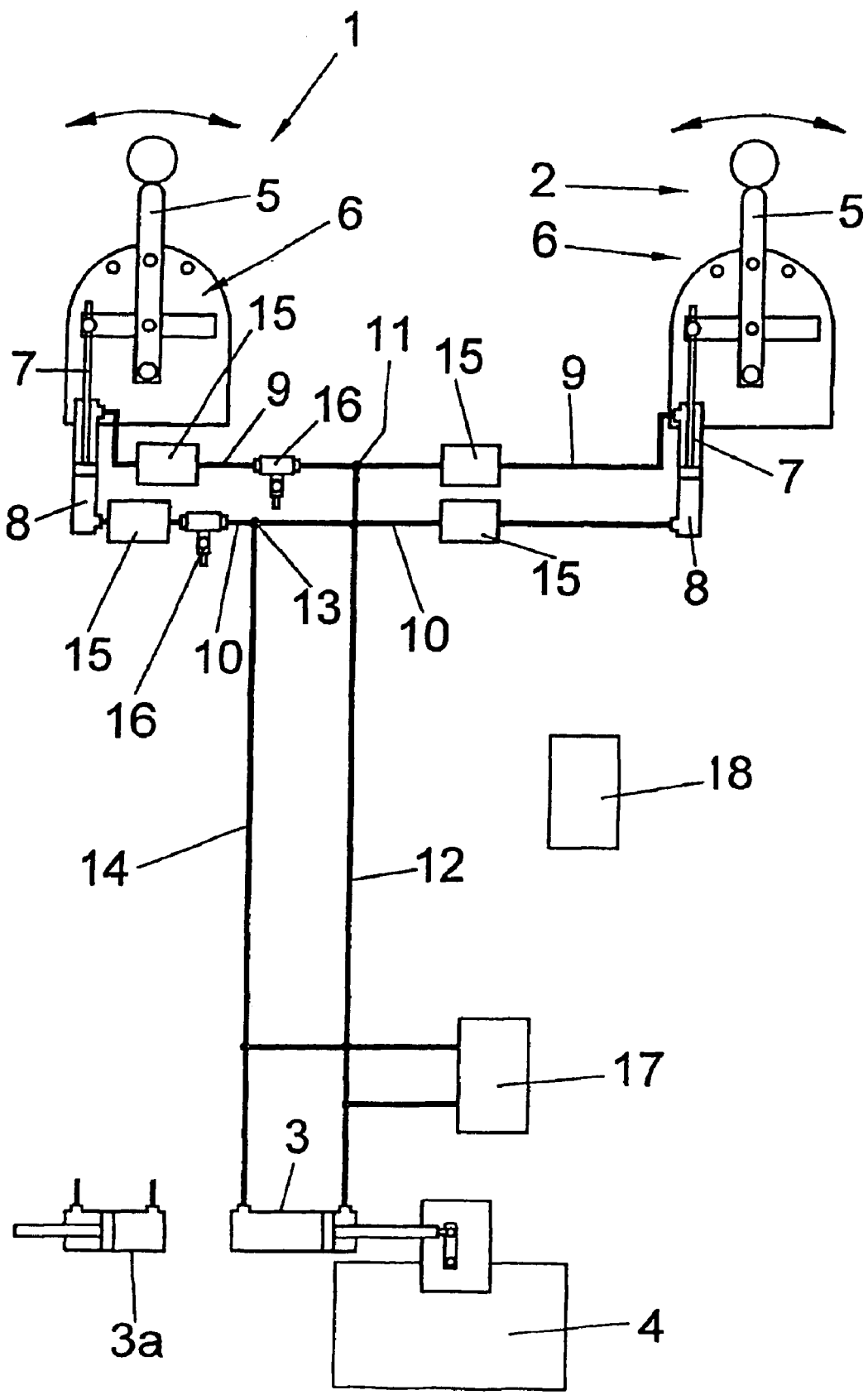

DEVICE FOR TELECONTROLLING A FUNCTION OF DRIVES

The invention relates to a device according to preamble, patent claim 1. A device of this type is known in the art (DE 198 02 517 A1).

The object of the invention is to improve a device of this type. To achieve this object, a device as claimed in claim 1 is embodied.

The special feature of the device according to the invention is that by means of a valve the two opposing working spaces of the at least one working cylinder configuration can be connected with each other, so that especially also in the event of blocked hand switch boxes it is possible to set or adjust the working cylinder configuration.

Further embodiments of the invention are described in the dependent claims.

The invention is described in more detail below based on the drawing, which shows a simplified depiction of the functions of a control system with two control cylinders and one working cylinder.

The control system depicted in the drawing comprises two spatially separate switch boxes 1 and 2, by means of which a common working cylinder 3 of these switch boxes can optionally be controlled hydraulically for the control of a drive 4, for example of a transmission or an output regulator (gas control element) of this drive. For this purpose, the hand switch boxes 1 and 2 are designed identically in the depicted embodiment and each have a swiveling hand lever 5, which works together with the piston rod 7 of a positioning cylinder 8 by means of a lever transmission generally designated 6 or another suitable transmission. The positioning cylinder 8 is designed as a double action cylinder with two chambers, with one chamber connected to a hydraulic control line 9 and with the other chamber connected to a hydraulic control line 10. The two control lines 9 of the switch boxes 1 and 2 are connected at 11 to a common hydraulic control line 12 and the two control lines 9 are connected at 13 to a common control line 14. The control lines 12 and 14 both lead to a chamber of the likewise double action working cylinder 3. Both the control lines 9 and 10 are provided with shut-off valves, which can be actuated electrically and with which, by means of a control unit, can be used to optionally release one hand switch box 1 or 2 for control of the drive 4 and the other hand switch box 2 or 1 is blocked, in that the corresponding control lines 9 and 10 for the blocked hand switch box 1 or 2 are blocked and the corresponding control lines for the other hand switch box are opened via the valves 15.

Connections 16 are provided for adding hydraulic fluid (hydraulic oil) and for bleeding of the lines. A valve designated 17 can be actuated preferably electrically so that in open condition it connects the two control lines 12 and 14 and therefore also the two chambers of the working cylinder 3, so that for example when the hand switch boxes 1 and 2 or hand levers 5 are blocked in their starting position by closing the valves 15, the piston 3' of the working cylinder 3, with the opened valve 17, can be adjusted to apposition that corresponds to the position of the hand boxes or the hand lever 5. This adjustment of the working cylinder 3 is always necessary, for example, when hydraulic fluid is added by means of the connections 16.

The depicted control system is suitable especially as a control system for motorboats, for example smaller motor yachts with two spatially separate navigating stands. The hand switch boxes 1 and 2 are then preferably designed so that by means of the respective hand lever 5 and the lever transmission 6 it is possible to actuate yet another positioning cylinder, which in the same manner as the positioning cylinder 8 is connected with a further positioning cylinder by means of hydraulic lines and serves to control a further motor function, as indicated in the drawing with the positioning cylinder 3a, whereby then for example one transmission of the drive 4 is actuated by means of the respective positioning cylinder 8 in a first swivel movement of the hand lever 5 from the neutral position depicted in the drawing for forward or reverse movement and then with a further swiveling of the hand lever 5 beyond this first angle area, and control of the power of the drive 4 takes place via the further positioning cylinder provided for on the hand switch box 1 and the corresponding working cylinder 3a. The embodiment is then such that blocking the valves 15 causes the respective hand switch box 1 or 2 to be blocked in its starting position, so that neither of the two functions can be executed through the blocked hand switch box 1 or 2. The electronic circuitry 18 that controls the valves 15 is then designed so that switching from one hand switch box 1 to the other hand switch box 2 is only possible if the hand lever 5 of the hand switch box 1 or 2 that is released at the time of switching is in a neutral starting position.

The invention was described above based on a sample embodiment. It goes without saying that numerous variations and modifications are possible without abandoning the underlying inventive idea of the invention.

Reference Numbers 1,2 hand switch box
3,3a working cylinder
4 drive
5 hand lever
6 transmission
7 piston rod
8 positioning cylinder
9,10 hydraulic control line
11 connection point
12 hydraulic control line
13 connection point
14 hydraulic control line
15 shut-off valve
16 connection
17 valve
18 electronic control circuitry

What is claimed is:

1. A control system for controlling motor functions of a drive, comprising at least two hand switch boxes spatially separate from the drive to be controlled and which for the control of a first and second motor function of the drive have a first and second double action cylinder with two oppositely actuated cylinder chambers for a hydraulic flow medium that are connected by means of control lines carrying the hydraulic flow medium with the cylinder chambers of a first and second working cylinder allocated to said first and second motor function, whereby the outputs of the first and second double action cylinder and first and second working cylinder are parallel connected and at least one shut-off valve device is provided for in the control lines for the controlled switching on and off of the hand switch boxes wherein that parallel to the first and second working cylinder or the oppositely actuated cylinder chambers of the first and second working cylinder is a further valve, which when opened enables a hydraulic connection between the oppositely actuated cylinder chambers of the first and second working cylinder, wherein said first motor function is actuated by said first double action cylinder in a first swivel movement of a hand lever from a neutral position and said second motor function is actuated by said second double action cylinder in another swiveling of the hand lever.

2. The control system as claimed in claim 1, wherein the working cylinder configuration comprises one working cylinder with two oppositely actuated cylinder chambers.

3. The device control system as claimed in claim 1, further comprising electronic control circuitry, which first enables blocking of one hand switch box by a shut-off valve when the hand lever of the hand switch box to be blocked is in the neutral position.

4. The control system as claimed in claim 1, wherein in each of the two lines leading to the oppositely actuated cylinder chambers of the first and second double action cylinder there is a shut-off valve.

5. The control system as claimed in claim 1, further comprising connections on the control lines for adding hydraulic fluid and for bleeding of the lines.

6. A control system for controlling two functions, comprising
- a first double action cylinder having a first and second port,
- a first piston within said first double action cylinder,
- a first controller connected to said first piston for moving said first piston within said first double action cylinder,
- a second double action cylinder having a first and second port,
- a second piston within said second double action cylinder,
- a second controller connected to said second piston for moving said second piston within said second double action cylinder,
- a first line connected between said first port of said first double action cylinder and said first port of said second double action cylinder,
- a pair of shut off valves in said first line,
- a second line connected between said second port of said first double action cylinder and said second port of said second double action cylinder,
- a pair of shut off valves in said second line,
- a first and second working cylinder, and
- control lines connected between said first and second lines and said first and second working cylinders.

7. The control system of claim 6, further comprising a controller opening and closing said shut off valves.

8. A device for remote control of a function of drives in vehicles or machines, comprising at least two hand switch boxes spatially separate from the drive to be controlled and which for the control of at least one function of the drive have a double action cylinder with two oppositely actuated cylinder chambers for a hydraulic flow medium that are connected by means of control lines carrying the hydraulic flow medium with the cylinder chambers of a working cylinder allocated to the function, whereby the outputs of the control cylinder configurations are parallel connected and at least one shut-off valve device is provided for in the control lines for the controlled switching on and off of the hand switch boxes wherein that parallel to the at least one working cylinder configuration or the oppositely actuated cylinder chambers of this configuration there is a further valve, which when opened enables a hydraulic connection between the oppositely actuated cylinder chambers of the working cylinder configuration, further comprising electronic control circuitry, which first enables blocking of one hand switch box by a shut-off valve0 when the hand lever of the hand switch box to be blocked is in a specified neutral position.

* * * * *